United States Patent [19]

Murayama

[11] 4,010,013
[45] Mar. 1, 1977

[54] EQUIPMENT FOR TREATING WASTE GAS CONTAINING TAR MIST

[75] Inventor: Takao Murayama, Yokohama, Japan

[73] Assignees: Taisei Kensetsu Kabushiki Kaisha; Tokyo Gas Company Limited, both of Tokyo, Japan

[22] Filed: May 28, 1975

[21] Appl. No.: 582,413

[30] Foreign Application Priority Data

Apr. 8, 1975 Japan .............. 50-41792

[52] U.S. Cl. .................. 55/286; 55/262; 55/266; 55/341 R; 55/350

[51] Int. Cl.² .................. B01D 46/04

[58] Field of Search ........... 55/259, 261, 266, 286, 55/300, 341, 304, 350, 262; 210/75, 193

[56] References Cited

UNITED STATES PATENTS

| | | | |
|---|---|---|---|
| 1,928,670 | 10/1933 | McCrery | 55/300 |
| 2,429,751 | 10/1947 | Gohr et al. | 55/341 X |
| 2,875,847 | 3/1959 | Pring | 55/341 X |
| 3,041,808 | 7/1962 | Snyder | 55/341 X |
| 3,411,929 | 11/1968 | Garrett | 55/261 X |

OTHER PUBLICATIONS

Flextube explosion, 6/28/1966, Filtomor Engineering Bulletin 1000, P.O. Box 305, Orange, N.J., 07051.

*Primary Examiner*—Frank W. Lutter
*Assistant Examiner*—David L. Lacey

[57] ABSTRACT

Equipment for treating waste gas containing tar mist is constituted by bag houses having bag filters therein and in which a filter cleaning apparatus for each filter is installed, respectively, a conducting duct for waste gas containing tar mist connected to each bag house and equipped with a shut-off valve, respectively, a discharging duct for treated waste gas and a supply tube for supplying protective coating material which is caused to form a precoated layer on the surface of the bag filter. The efficiency of the waste gas treatment is improved by the action of the precoated layer in inhibiting the direct contact of tar mist with the bag filter.

2 Claims, 4 Drawing Figures

EQUIPMENT FOR TREATING WASTE GAS CONTAINING TAR MIST

BACKGROUND OF THE INVENTION

This invention relates to equipment for treating waste gas containing tar mist.

In the prior art, waste gas containing tar mist which is wet and viscous, is treated with washing equipment such as a wet electric dust collector or a venturi scrubber. Such equipment, however, requires a large amount of water and the problem of treatment of effluent is serious. If said mist is capable of being captured with a dry dust collector, the problem of after-treatment is not necessary. However, in case gravity or inertia is utilized, such mist will adhere to the wall surface of the apparatus and it becomes impossible to remove it. When using a bag filter, clogging of the filter will occur and the filtration becomes difficult.

This invention provides equipment which overcomes such drawbacks. It relates to a dry filter dust collector by which the efficiency of treatment of waste gas containing tar mist is improved rapidly by removing the wet and viscous tar mist without contacting it directly with the bag filter in accordance with the characteristic features of the equipment of this invention.

SUMMARY OF THE INVENTION

It is an object of this invention to provide a dry filter dust collector by which treatment of waste gas containing tar mist is improved by rapidly removing the wet and viscous tar mist without contacting it directly with the bag filter by precoating a protective material on the bag filter.

The above object is achieved in accordance with this invention by the provision of equipment for treating waste gas treatment containing tar mist consisting of bag filters, bag houses in which a filter cleaning apparatus for each filter is installed respectively, a conducting duct for waste gas containing tar mist connected to said each bag house and equipped with a shut-off valve, respectively, a discharging duct for treated waste gas and a supply tube for supplying protective material which is caused to form a precoated layer for the capture of tar mist on the surface of the bag filter. By the provision of the precoated layer of protective material, tar mist is prevented from directly contacting the wall surface of bag filter, thereby preventing the clogging of the bag filter and improving the efficiency of the equipment while the cleaning of the precoated layer of protective material can be carried out easily.

DETAILED DESCRIPTION OF THE PREFERRED EMBODIMENT

Figure 1:
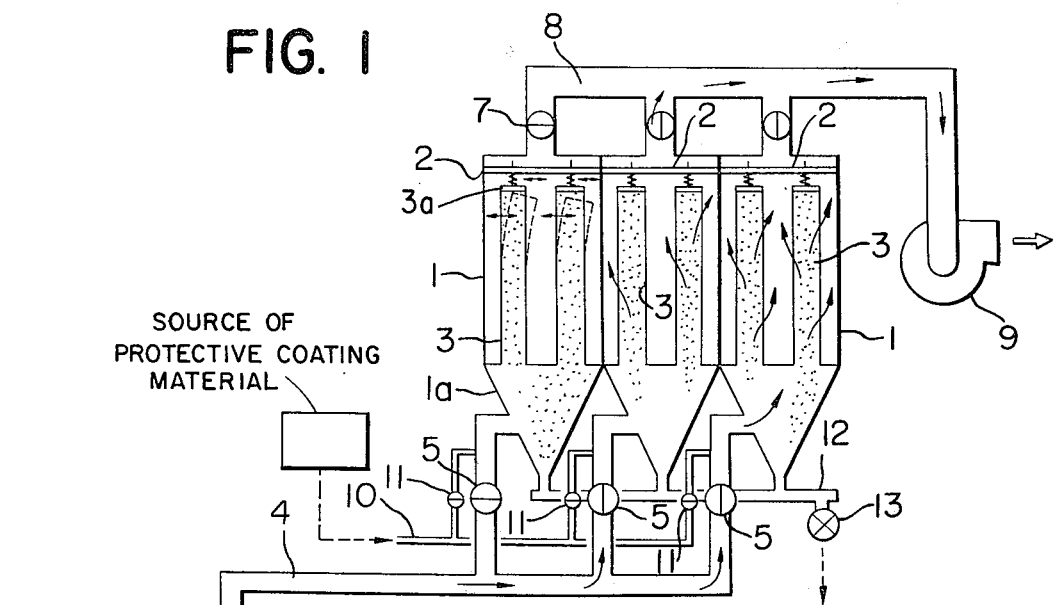
FIG. 1 is a longitudinal sectional view of the equipment of the invention with the parts in the operational condition for cleaning the precoated layer in the bag filter inside the bag house.

In the treatment of waste gas containing wet tar mist and viscous dust, said tar mist is captured with washing equipment such as a wet electric dust collector or a venturi scrubber. However, as described previously, such equipment requires a large amount of water, and the treatment of effluent is a serious problem. If said mist were capable of being captured with a dry dust collector, the problem of after-treatment would not exist and hence use of such a collector would be advantageous. However, where gravity or inertia is utilized, such mist will adhere to the wall surface of the equipment and it is impossible to remove. With a filter dust collector using bag filters, the filter is clogged and the filtration becomes impossible very soon. In case of dry treatment, it is impossible to capture said tar mist without an electric dust collector or filter dust collector, because the diameter of the particles of tar mist is small such as 0.01 to 10 $\mu$.

In view of the above, this invention provides treating equipment for waste gas containing tar mist which is characterized by: bag houses having filters therein and in which a filter cleaning apparatus for said each filter is installed, respectively, a conduction duct for tar mist waste gas and a discharging duct for treated waste gas which is connected to each bag house and provided with a valve, respectively, and a supply for protective coating material which is caused to form a precoated layer for capturing said tar mist on said bag filter. The dry filter dust collector thus constructed in accordance with this invention provides increased efficiency of treatment of waste gas containing tar mist without contacting said wet and viscous tar mist directly with the bag filter by precoating the protective coating material on the surface of bag filter.

Since the equipment of this invention is constructed as described above, the valve of the conducting duct for waste gas containing tar mist connected to each bag house is closed and the valve of the supply tube for protective coating material is opened, so as to pre-coat a layer of protective coating material on the surface of the bag filter in said bag house by the supply of the material into the bag house through said supply tube, and then said supply tube is shut. Thereafter, the conducting duct for waste gas containing said tar mist is opened by opening the valve in said duct for supplying waste gas containing tar mist into the bag house through said conducting duct, and said tar mist in the waste gas is captured by the precoated layer of protective coating material on the surface of bag filter when said waste gas is filtered by said bag filter and clogging of the bag filter will not occur, because said tar mist does not cntact the bag filter directly.

Thus, the waste gas purified by the filtration through said bag filter is discharged from the equipment through the discharging duct for treated waste gas.

When the value of the pressure drop across said bag filter is increased to a predetermined value, the precoated layer of protective coating material containing tar mist on the filter surface is removed by actuating the filter cleaning apparatus in the bag house after shutting said conducting duct for waste gas and the discharging duct for treated waste gas. Then, the precoating of protective coating material on the surface of the bag filter is again conducted as described above and the waste gas containing tar mist is supplied for treatment. This operation is performed repeatedly.

Thus, with the equipment of this invention, the waste gas containing wet and viscous tar mist is capable of being treated efficiently without causing clogging of the bag filter.

It is unnecessary to say that the protective coating layer precoated on the surface of said bag filter must adhere to the surface of filter bag sufficiently and the tar mist must not be allowed to pass therethrough, but, if said protective coating material layer is removed after being stripped from the bag filter and disposed of at a location remote from the equipment and purchase of new protective coating material is necessitated, and disadvantages in operating costs will result. Therefore, in the present invention, pulverized coal or coke is used as the protective coating material, and when using pulverized coal or coke, it can be returned to the original process from which it was obtained, such as a coke or coal gas manufacturing apparatus, and re-used there.

This invention will be described with reference to the embodiment thereof illustrated in the drawings. In the drawings 1 the individual bag houses of designates a plurality of bag houses installed in parallel, and a filter bag mounting means 3a on which a bag filter 3 is mounted and a vibrating device 2 for vibrating said filter bag mounting means 3a in the bag house are installed in each bag house. A conducting duct 4 for waste gas containing tar mist has branches connected to the hopper part 1a of each bag house and each of which is equipped with a shut-off valve 5 and at the intake end of duct 4 a hood collection of waste gas is installed.

At the top of said each bag house 1, a discharging ductt 8 for treated waste gas has branches each of which is equipped with a shut-off valve 7 connected respectively, and said duct 8 is connected to an exhaust fan 9.

Further, 10 is a supply tube for the protective coating material having branches connected to the branches conducting duct 4 for waste gas containing said tar mist and each branch is equipped with a shut-off valve 11.

Furthermore, at the lower end of each hopper part 1a in said bag house 1, a screw feeder 12 is connected for discharging the lubricant containing tar mist.

A shut-off valve 13 is provided in a discharge duct 12 to control the discharge of collected protective coating material and tar mist.

Figure 2:
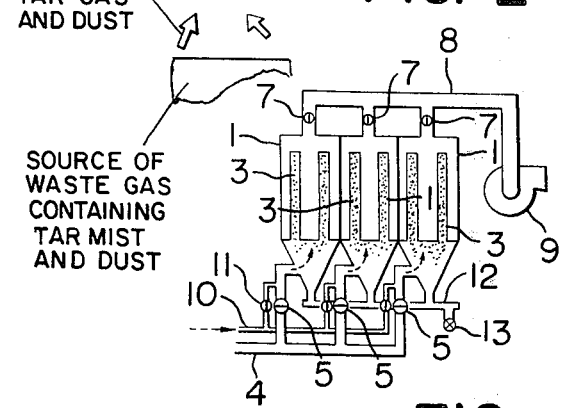
FIGS. 2 to 4 are similar views on a smaller scale showing the equipment in operational conditions for treating said waste gas.

In case of treating waste gas containing tar mist with this equipment, the protective coating material is introduced into each bag house 1 from said supply tube 10 by actuating the exhaust fan 9 after shutting the valves 5 in the branches of conducting duct 4 and opening each valve 11 in the branches of the supply tube 10 for protective coating material and valves 7 in the branches of discharging duct 8 as shown in FIG. 2, and the protective coating material is adhered to the inside of bag filter 3 to form the precoated layer of the protective coating material.

Then, when the waste gas containing tar mist is introduced into the bag house 1 through said duct 4 after closing said valve 11 and opening said valves 5, the tar mist in said waste gas is captured by the precoated layer of protective coating material on in the bag filter 3 without contacting directly said bag filter 3 and the remaining waste gas is filtered by said bag filter 3. Thus, the purified waste gas is discharged to the outside through said duct 8.

Figure 3:
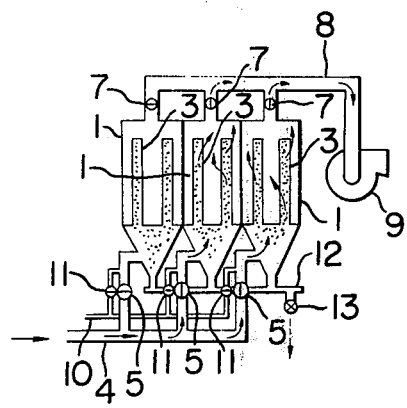

When the value of pressure drop in said bag filter 3 reaches a predetermined value, the precoated layer of protective coating material containing tar mist on the surface of bag filter 3 is removed by the action of a vibrating device 2 connected to the bag filters 3 after each valve 5 and 7 is closed as shown in FIG. 3.

Figure 4:
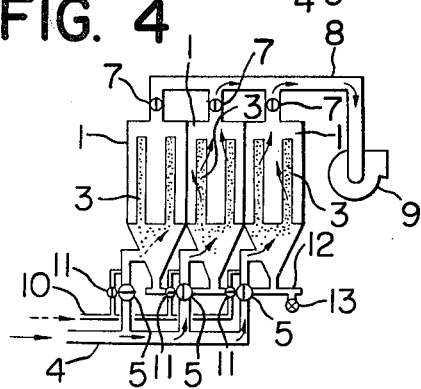

Then, protective coating material as shown in FIG. 4, the protective coating material is introduced only into the bag house 1 in which the removal of said precoated layer has been completed by opening the appropriate valves 7 and 11; and after the proper precoated layer is formed on the surface of bag filter 3, the waste gas containing tar mist is introduced.

Then, the precoated layer of protective coating material on of bag filter 3 in the next bag house 1 is removed. Thus, the treatment of said waste gas is performed by repeating the precoating of protective coating material removal thereof and conducting of waste gas containing tar mist. The protective coating material containing tar mist which is removed from the bag filter 3 by the process described above is collected in a hopper 1a, conveyed by said screw feeder 12 and discharged through the valve 13 to the outside.

Although this invention is illustrated by an embodiment as described above, it is not intended to limit this invention only to such an embodiment. Other modifications and alteration in design and construction may be practiced within the range which does not deviate from the spirit of this invention.

I claim:

1. Equipment for treating waste gas containing tar mist, comprising at least one bag housing, a valved waste gas supply duct connected to a source of waste gas having tar mist and dust therein and coupled to said housing for supplying waste gas containing tar mist to said housing, a valved discharge duct coupled to said housing for discharging treated waste gas from the housing, a filter bag mounting means in said housing and a filter bag mounted thereon in a position for filtering the waste gas passing through said housing from said waste gas supply duct to said discharge duct, filter vibrating means operatively associated with said filter bag mounting means for removing accumulated filter material from the filter bag, a valved protective coating material supply duct connected to a source of protective coating material for a waste gas containing tar mist and coupled to said equipment for feeding said protective coating material to said housing on the same side of said filter bag as said supply duct for coating the side of said filter bag which is exposed to the tar mist containing waste gas, and a valve filtered material discharge duct coupled to said housing for removing filtered material removed from said filter bag by the operation of said filter vibrating means.

2. Equipment as claimed in claim 1 in which there is a plurality of bag housings each containing a filter bag mounting means and a filter bag and a filter vibrating means, said housings being connected in parallel to said waste gas supply duct, said discharge duct, said protective coating material supply duct and said filtered material discharge duct.

* * * * *